United States Patent
Godar

(10) Patent No.: US 11,134,236 B2
(45) Date of Patent: Sep. 28, 2021

(54) IMAGE PROCESSING DEVICE AND SYSTEM

(71) Applicant: Sony Interactive Entertainment Inc., Tokyo (JP)

(72) Inventor: Anthony William Godar, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 41 days.

(21) Appl. No.: 16/619,649

(22) PCT Filed: May 17, 2018

(86) PCT No.: PCT/GB2018/051340
§ 371 (c)(1),
(2) Date: Dec. 5, 2019

(87) PCT Pub. No.: WO2018/224799
PCT Pub. Date: Dec. 13, 2018

(65) Prior Publication Data
US 2020/0099913 A1   Mar. 26, 2020

(30) Foreign Application Priority Data

Jun. 9, 2017 (GB) .................................... 1709204

(51) Int. Cl.
*H04N 13/15* (2018.01)
*H04N 13/106* (2018.01)
(Continued)

(52) U.S. Cl.
CPC ......... *H04N 13/158* (2018.05); *G06T 3/0087* (2013.01); *H04N 13/332* (2018.05);
(Continued)

(58) Field of Classification Search
CPC .. G06T 3/0087; H04N 13/158; H04N 13/332; H04N 19/119; H04N 19/146; H04N 19/167
See application file for complete search history.

(56) References Cited

U.S. PATENT DOCUMENTS

2006/0045363 A1\* 3/2006 Dei ................ H04N 21/234354
382/232
2007/0121629 A1\* 5/2007 Cuijpers ............. H04L 12/1859
370/390
(Continued)

FOREIGN PATENT DOCUMENTS

| WO | 2013028565 A1 | 2/2013 |
| WO | 2017071167 A1 | 5/2017 |
| WO | 2017093611 A1 | 6/2017 |

OTHER PUBLICATIONS

International Search Report and Written Opinion for corresponding PCT Application No. PCT/GB2018/0581340, 16 pages, dated Jul. 13, 2018.

(Continued)

*Primary Examiner* — Kathleen V Nguyen
(74) *Attorney, Agent, or Firm* — Matthew B. Dernier, Esq.

(57) ABSTRACT

A video providing device for providing video content having a plurality of viewpoints, the device includes: a video storage unit operable to store a plurality of versions of a video for each of a plurality of the viewpoints in the video content, the videos being encoded such that each video includes a region of high resolution corresponding to that viewpoint, where a plurality of the videos each include the same region of high resolution, and each video having the same region of high resolution is encoded with a temporal offset of the group of pictures relative to those other videos with the same region of high resolution, the group of
(Continued)

pictures offsets defining video switching times for each video, a viewpoint determining unit operable to determine a requested viewpoint in the video content, a timing identification unit operable to identify a next suitable video switching time from amongst the plurality of video switching times, a video selection unit operable to select a video with a high resolution region corresponding to the requested viewpoint and the identified video switching time, and a video transmitting unit operable to transmit the selected video to a video receiving device.

13 Claims, 4 Drawing Sheets

(51) Int. Cl.
*H04N 19/119* (2014.01)
*H04N 19/146* (2014.01)
*H04N 19/167* (2014.01)
*H04N 19/177* (2014.01)
*H04N 19/33* (2014.01)
*H04N 13/332* (2018.01)
*G06T 3/00* (2006.01)
*H04N 19/597* (2014.01)

(52) U.S. Cl.
CPC ......... *H04N 19/119* (2014.11); *H04N 19/146* (2014.11); *H04N 19/167* (2014.11); *H04N 19/177* (2014.11); *H04N 19/33* (2014.11); *H04N 19/597* (2014.11)

(56) References Cited

U.S. PATENT DOCUMENTS

| | | |
|---|---|---|
| 2013/0091251 A1 | 4/2013 | Walker |
| 2018/0241988 A1 | 8/2018 | Zhou |
| 2019/0158815 A1* | 5/2019 | He .................. H04N 19/597 |

OTHER PUBLICATIONS

Kurutepe E et al: "Client-Driven Selective Streaming of Multi view Video for Interactive 3DTV" IEEE Transactions on Circuits and Systems for Video Technology, Institute of Electrical and Electronics Engineers, USA, vol. 17, No. 11 pp. 1558-1565 (Nov. 1, 2007).
Xie Jian et al: "A Multi-view Video Coding Scheme for Interactive Streaming with Low Decoding Cost" 25, Picture Coding Symposium; Beijing, 4 pages (Apr. 24, 2006).
Aditya Mavlankar et al: "An interactive region-of-interest video streaming system for online lecture viewing" Packet Video Workshop (PV), 2010 18th International, IEEE, pp. 64-71 (Dec. 13, 2010).
Tekalp A M et al: "3DTV over IP" IEEE Signal Processing Magazine, IEEE Service Center, Piscataway, NJ. US. vol. 24, No. 6, pp. 77-87 (Nov. 1, 2007).
Gun Bang ( Etri) et al: "[FTV AHG] The head mounted display application for Free-viewpoint video service", 112, MPEG Meeting, Warsaw; (Motion Picture Expert Group or ISO/IEC JTC1/SC29/WG11) No. m36488, 6 pages, (Jun. 18, 2015).
Search Report for corresponding GB Application No. 1709204.0, 1 page, dated Nov. 15, 2017.
Communication Pursuant to Article 94(3) for corresponding EP Application No. 18727389.1, 6 pages, dated Mar. 29, 2021.

* cited by examiner

IMAGE PROCESSING DEVICE AND SYSTEM

BACKGROUND

This invention relates to an image processing device and system.

Immersive video content has become increasingly widespread in recent years, with panoramic and even 360 degree video content being generated increasingly often. Such content is able to be navigated by a user in some manner to simulate being in the location in which the content is captured and looking around. This navigation may be performed using inputs via a controller or the like, or may be linked to the movement of a device operated by a user; for example, the user could reposition or rotate their phone to cause a change in the viewpoint.

In other arrangements, a head mountable display (HMD) is used to present such content to a user. This may be advantageous, as the user can simply move their head in order to cause a change in the displayed viewpoint; this is an intuitive interaction with the content that further increases the sense of immersion.

One problem associated with the provision of video content that encompasses a plurality of viewpoints is that of the size of the video content. There is a trade-off between video quality and the file size; the higher quality the video content, the larger the corresponding file size. Understandably, there is a desire to provide the maximum possible video quality so as to ensure a good user experience; however due to bandwidth restrictions there is a limit to how much data can be used.

It is therefore common that lower-than-desired resolution content is provided (for example, using a 4K resolution image for a sphere can result in a viewpoint that has a resolution of 1000×1000 pixels being displayed) in order to reduce the file size to a reasonable level. This can cause further degradation in display quality, as this is lower than the resolution of many displays that are currently available.

One solution that has been previously proposed is that of capturing a very high resolution video, and then using this to generate a plurality of videos each having a different area of the video in high quality and the rest in low quality. This mitigates the problems described above, by providing a high-quality image in the direction of viewing whilst maintaining a small bandwidth requirement, but in doing so generates further problems such as that of having to switch videos when the viewer changes their viewpoint in order to provide a high quality image in the direction of view.

SUMMARY

The presently proposed arrangement seeks to mitigate the above problems.

Various aspects and features of the present invention are defined in the appended claims and within the text of the accompanying description and include at least a video providing device, a video receiving device, a method of operating each of these devices, and a computer program.

BRIEF DESCRIPTION OF THE DRAWINGS

Embodiments of the invention will now be described, by way of example only, with reference to the accompanying drawings, in which.

DETAILED DESCRIPTION

Figure 1:
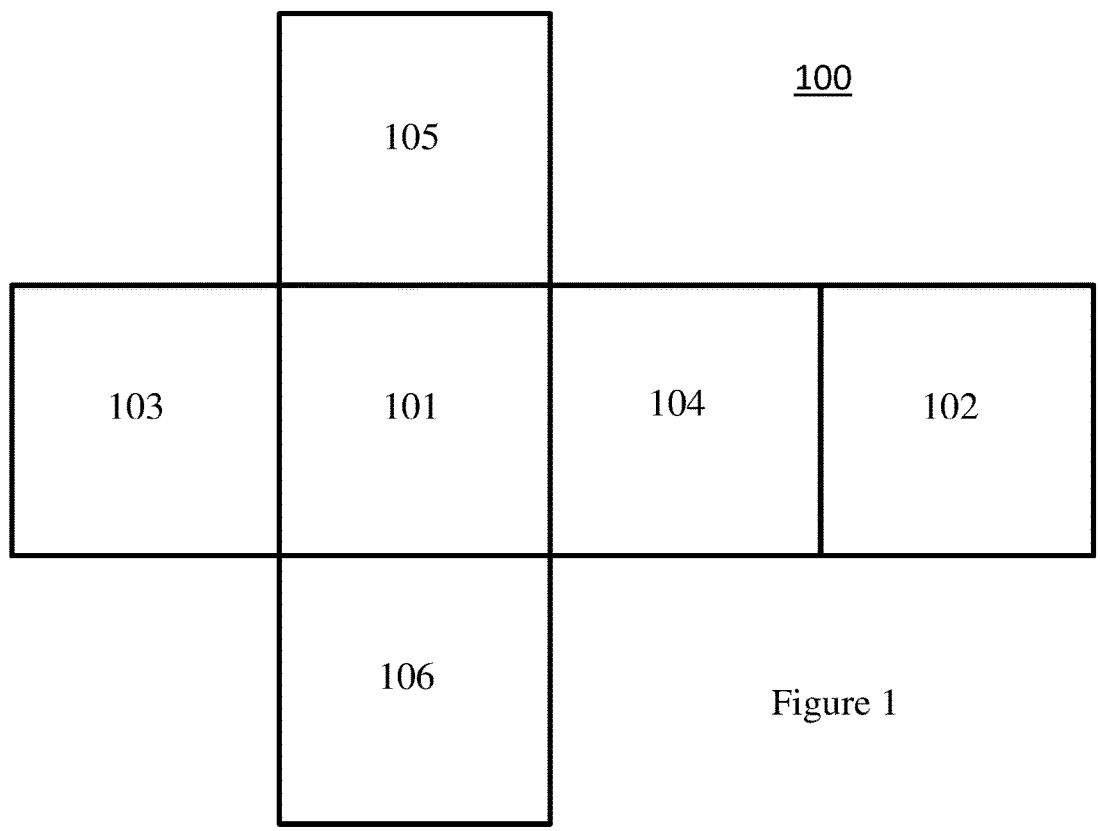
FIG. 1 schematically illustrates a video mapping layout.

When providing 360 degree video content, or indeed any content that covers an area larger than that which may be viewed by a user at a single time, it may be desirable to map the video to a shape other than a sphere in order to simplify playback. For example, the video content could be mapped to a cube in order to provide six video tiles that between them represent the whole of the video content. FIG. 1 schematically illustrates a plan view of such a cube 100, with which six viewpoints are provided. Of course any suitable mapping could be used, rather than being limited to a cube, so as to provide any number of viewpoints.

The cube 100 comprises a front view 101, rear view 102, left view 103, right view 104, up view 105 and down view 106. These directions may be defined in any manner; for example the so-called 'front view' could simply be the direction in which the viewer is looking and so could vary throughout the playback of the content. The naming convention used is not essential, so long as the viewpoints can be distinguished and correctly identified.

In some embodiments, the front view is defined as a particular tile and is constant for a particular stream. In the example of FIG. 1, six separate streams could be provided to allow for adaptive streaming; each of these comprising only a single, high-resolution tile.

As noted above, such an arrangement is advantageous in that by selecting a particular stream, the viewer can be provided with video content that is of high display quality in a direction of view without having to stream high-quality video content for each direction of view at the same time. However, a problem associated with such an arrangement is that a delay is experienced before the viewer is presented with high quality video content for a new viewpoint after changing their direction of view. During the time of the delay, the viewer is left viewing content corresponding to the earlier viewing direction.

In the present disclosure, video content is provided in a format that utilises a group of pictures (GOP) format. One restriction of this is that switching may only be performed at the GOP boundary in the target video, and therefore if the viewer changes their viewpoint at any other time then the change in which video is displayed is delayed until the next GOP boundary. This may result in a delay of a whole second in many current videos, depending on the GOP duration, which may be too high a latency to go unnoticed by a user—especially in a virtual reality application.

While this latency could be reduced by simply using a shorter GOP, changing only this aspect of a transmitted video would increase the bandwidth requirements significantly and thus prove to be problematic in other ways.

Embodiments according to the present disclosure address this by providing a plurality of videos for each viewpoint. Each video within a plurality comprises the same content, but encoded such that the GOPs for each video are not aligned; instead, they have an offset from one another. As a result of this, there are a plurality of available GOP starting times in target videos. This means that rather than having to wait the whole remaining duration of a GOP in the present video in order to perform a video switch, it is possible to select a video in the plurality corresponding to the desired viewpoint that has a GOP boundary occurring sooner than this. In general, the offset to each GOP is of an amount smaller than the duration of the GOP.

Figure 2:
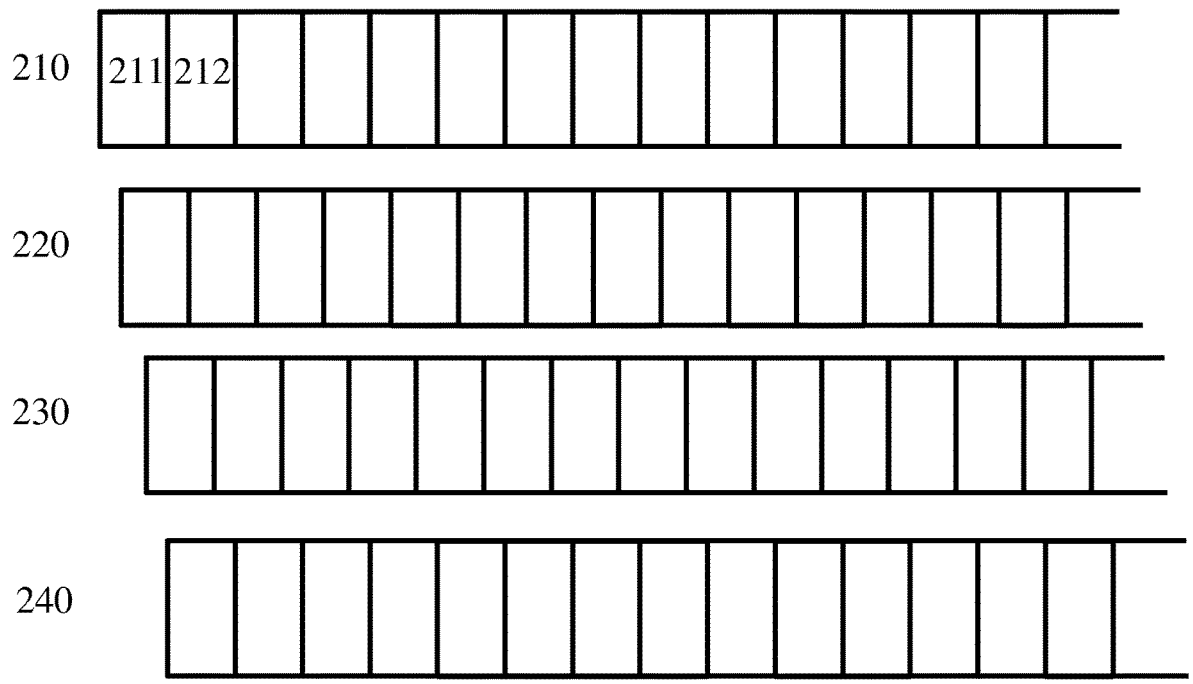
FIG. 2 schematically illustrates a plurality of videos with a GOP structure.

FIG. 2 schematically illustrates a group 200 of videos 210, 220, 230, 240 corresponding to a single viewpoint in a piece of video content. Each of these comprises a plurality of GOPs, such as GOPs 211 and 212 shown in video 210. Each of these videos 210, 220, 230, 240 is shown offset from one another so as to represent an offset of the timing of their respective GOPs. It is envisioned that such a group of videos, each video with the same respective offsets (although using the same offsets is not essential, as is discussed below), would exist for each viewpoint present in the video content. Of course, this grouping is entirely arbitrary; the videos could instead be grouped by GOP offset amount rather than view, but this application uses the latter grouping for the purpose of clarity.

In one example according to a method using the groups illustrated in FIG. 2, the GOP duration is one second. Video 210 (used as the reference video with respect to which offsets are defined) has no offset, while videos 220, 230 and 240 have a 0.25, 0.5 and 0.75 second offset respectively as measured with respect to the GOP timing of video 210. The videos 220, 230, 240 may be generated by omitting the first 0.25/0.5/0.75 seconds from the video and then encoding the videos in the usual manner.

In previous arrangements with an equivalent GOP duration, if the user changed their direction of view at 0.1 seconds into a GOP they would have to wait 0.9 seconds in order to switch videos. However, in this example, a video representing the other viewpoint with a GOP offset of 0.25 seconds (a video corresponding to the video 220 with respect to the offset) could instead be selected and playback could begin at the GOP boundary with a 0.15 second delay. This means that that the video switching delay is reduced from 0.9 seconds to 0.15 seconds, which may be short enough that the user is unaware of the switching of videos (or at least does not have their viewing experience significantly impaired).

This is therefore an example of an arrangement in which video switching may be performed at shorter intervals, without changing the bandwidth requirements for each transmitted video.

Figure 3:
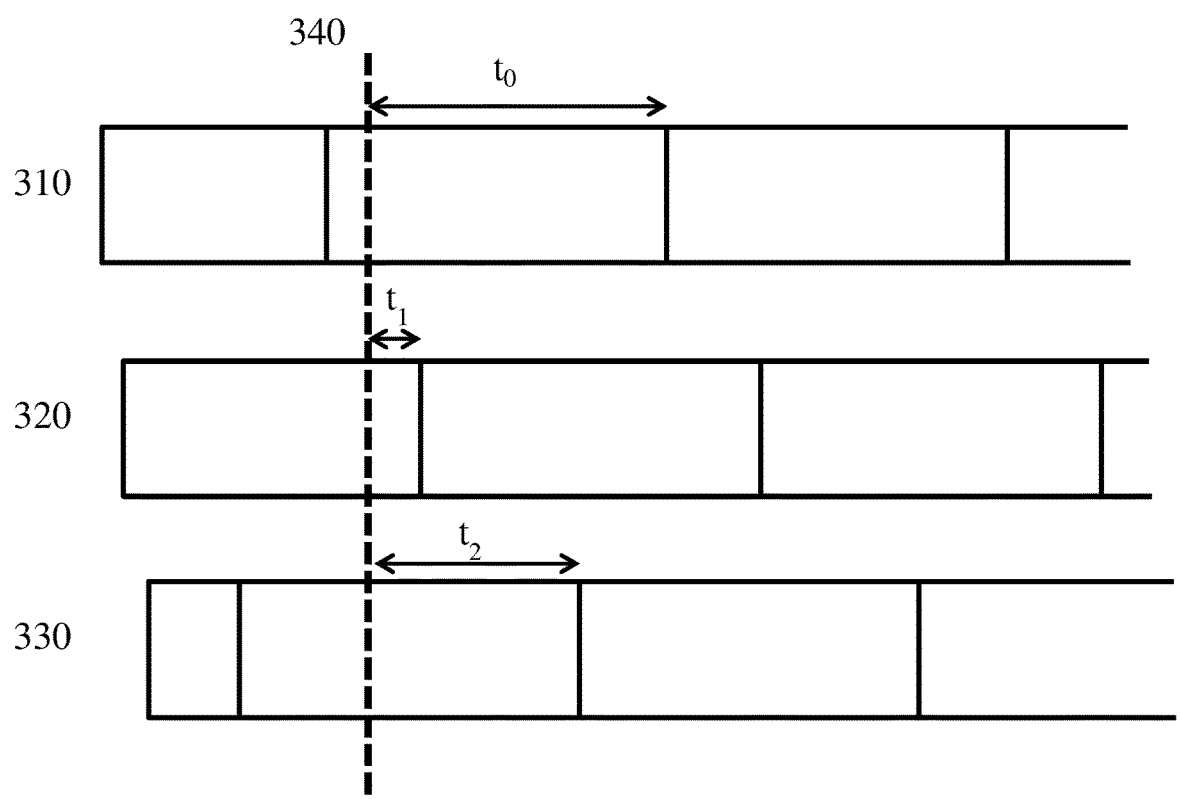
FIG. 3 schematically illustrates a video switching process.

FIG. 3 schematically illustrates a video switching method in which a first video 310 corresponds to a first viewpoint, and second and third videos 320 and 330 each correspond to a second viewpoint.

The video 310 is the currently selected video, for example one being transmitted by a server for viewing by the user of a viewing device. A switching time 340 is illustrated by a dashed line, which corresponds to a change in the requested viewpoint from the first viewpoint to the second, and this occurs at a time $t_0$ before the next GOP boundary in the first video 310.

Rather than waiting the time $t_0$ as in previously proposed arrangements, a switching may be performed to either of videos 320 or 330 instead, after respective times $t_1$ and $t_2$ that are each shorter than $t_0$. In some embodiments, a switch to video 320 is performed as the shorter time $t_1$ means that the delay in switching videos is more significantly reduced.

In some embodiments, however, the video 330 is instead selected as the video to be switched to. This is because there may be a non-negligible switching time required, for example to locate the video or to buffer the video content so as to ensure a smooth playback upon switching. In such embodiments the video corresponding shortest switching time (in this case $t_1$) may not be selected in favour of a video with a longer switching time (in this case $t_2$), for example by comparing the potential switching time ($t_1$ or $t_2$) with an assumed, predetermined or previously measured switching time threshold, and selecting the shortest potential switching time that is equal to or larger than this threshold. Nevertheless, even in these circumstances the time $t_2$ is shorter than $t_0$, and as a result advantages of the present arrangement are realised even in these embodiments in which the shortest time is not selected.

In some embodiments, it is also considered that the GOP duration is increased. For example, doubling the GOP duration to 2 seconds (relative to the example above) for a particular video would approximately halve the bandwidth requirements. A disadvantage of this is in that the video switching delay is usually increased significantly; however by providing a plurality of videos with a GOP offset as discussed above this problem is mitigated. Indeed, by extending the GOP duration a memory burden on the storage device is reduced and so extending the GOP duration may be advantageous in conjunction with use of the GOP offset implementation.

It would be appreciated by the skilled person in view of the above that any duration of GOP may be suitable, and that any number of videos with a GOP offset could be provided so as to provide a suitable balance between video switching delay and amount of storage required for all of the video content.

In order to achieve substantial data savings, in some embodiments the group of pictures duration is two seconds or more. In some embodiments, the group of pictures duration is determined so as to obtain a target bandwidth during transmission; for example, the video content could be encoded in view of average download speeds of viewers so as to ensure a smooth playback of the video for viewers. A lower bandwidth video could be provided by using a longer GOP duration, the GOP duration being determined as an amount which provides the desired data rate of the video content.

In some embodiments, the group of pictures offset is less than one second between two consecutively offset videos, and indeed less than half a second in a number of embodiments. The offset between two consecutively offset videos refers to the time difference between GOP boundaries between two videos that have sequential offsets; for example, 220 and 230 of FIG. 2 may be described as consecutively offset videos as no video exists with an offset between these two. In some embodiments, the group of pictures offset is not the same between each consecutively offset video. For example, the offsets could be 0.25 seconds, 0.5 seconds and 1 second; clearly the difference in offsets between the second and third videos is double that of the first and second.

The group of pictures offset may be dependent upon the content of the video content itself. For example, different genres of content could have different offsets. An example of this is comparing an action film to a romance film; in the former it would be expected that the viewer would look around the environment more frequently and more quickly in order to fully appreciate the events shown. In a romance film, however, the events may be more focused on a single interaction in a scene and thus the viewer's attention is likely to be concentrated in a single area and any head motion by the user is likely to be slower. In the latter case, it is therefore apparent that it may not be necessary to provide the same degree of responsiveness.

In embodiments, it may also be considered that the GOP offsets are varied over the duration of a piece of video content. This could be implemented in a number of manners, for example by providing a piece of content in one or more distinct segments, or by defining GOP offsets in an adaptable manner. An example of this is during the broadcast of a football match or the like; in this example, a viewer may frequently change their direction of view during the match itself and it is desirable to provide a good viewing experience during this. However, at half time or before/after the match the viewer is subjected to content that is either less interesting or less dynamic and as such will be likely to change their viewpoint much less often, and be less likely to notice an increased video switching time.

This could also be relevant when considering encoding video content on a viewpoint-by-viewpoint basis. Each viewpoint will contain different content, generally, and as a result a rapid video switching may not be required; for example, it may be assumed in some cases that the rear view will have little of interest to the user and as such fewer GOP-offset videos may be provided. Therefore in some embodiments the group of pictures offset for a video is dependent upon the viewpoint represented by that video.

The offset may also be varied responsive to content analysis; for example when a scene pans in a certain direction, the user can be expected to look further in that direction in anticipation of what will be seen; as a result a stream showing the next viewpoint in a panning direction may temporarily have shorter GOPs. Similarly, where stereo or surround sound is used, viewpoints corresponding to directions at which sounds exceed an absolute or relative threshold level may likewise temporarily have shorter GOPs in anticipation of a user looking round to identify the sound source in the images.

GOP modification could also be extended to analysing the potential data saving throughout content. For example, data savings may be increased without a substantial decrease in image quality if the content is relatively static due to inter-frame prediction; the GOP could therefore be further increased in duration for video content (or portions of the video content) in which there is not a large difference between successive frames.

Figure 4:
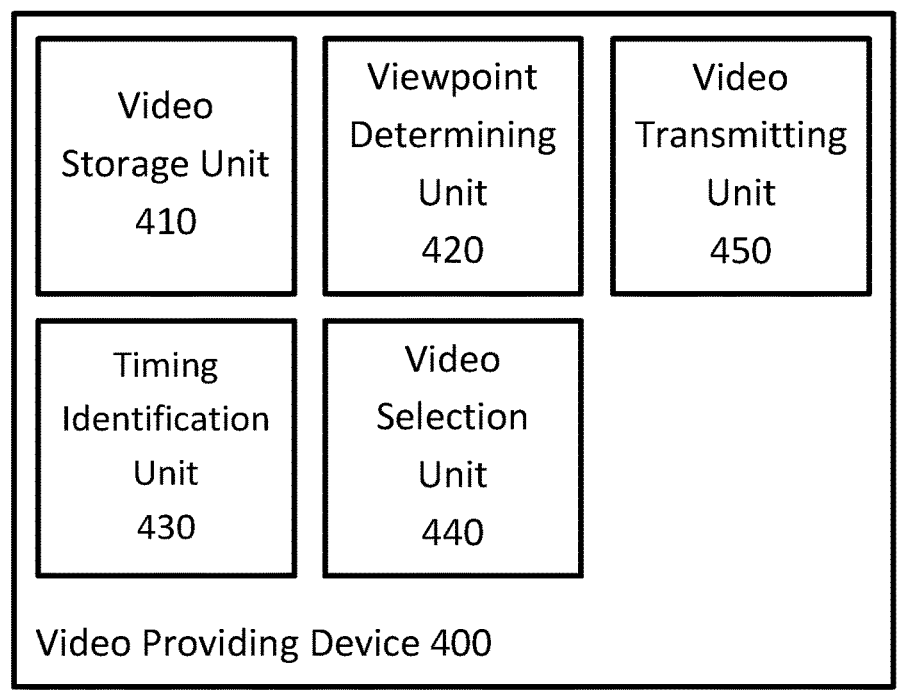
FIG. 4 schematically illustrates a video providing device.

FIG. 4 schematically illustrates a video providing device 400 for providing video content comprising a plurality of viewpoints. The video providing device 400 comprises a video storage unit 410, a viewpoint determining unit 420, a timing identification unit 430, a video selection unit 440, and a video providing unit 450.

The video storage unit 410 is operable to store a plurality of versions of a video for each of a plurality of the viewpoints in the video content, the videos being encoded such that each video comprises a region of high resolution corresponding to that viewpoint. A plurality of the videos each comprise the same region of high resolution, and each video comprising the same region of high resolution is encoded with a temporal offset of the group of pictures relative to those other videos with the same region of high resolution. The group of pictures offsets define video switching times for each video, such that the video with the next-occurring GOP boundary may be identified as a candidate for video switching (or indeed a different video, depending on the constraints of the switching process—for example, if there is a delay the next-but-one occurring GOP boundary may be more appropriate as described above).

The viewpoint determining unit 420 is operable to determine a requested viewpoint in the video content; this may be performed using information indicative of a location in the video, information requesting a particular tile of the video, information relating to HMD position/orientation for the display device, or any other suitable information that could be used to identify a region of the video that should be provided to the viewer.

The timing identification unit 430 is operable to identify a next suitable video switching time from amongst the plurality of video switching times; this may be performed using information about the GOP offsets for each respective video. For example, the elapsed time in the current GOP could be compared to a list of the GOP offsets associated with different available videos for the requested viewpoint to identify a video with the next occurring GOP boundary.

The video selection unit 440 is operable to select a video with a high resolution region corresponding to the requested viewpoint and the identified video switching time. This comprises selection a video with an appropriately-timed GOP boundary, the video including a region of high resolution in the direction of the viewer's direction of view.

The video transmitting unit 450 is operable to transmit the selected video to a video receiving device. This may be via any suitable communication means, such as a wired or wireless connection, through the internet or a local network or the like.

Figure 5:
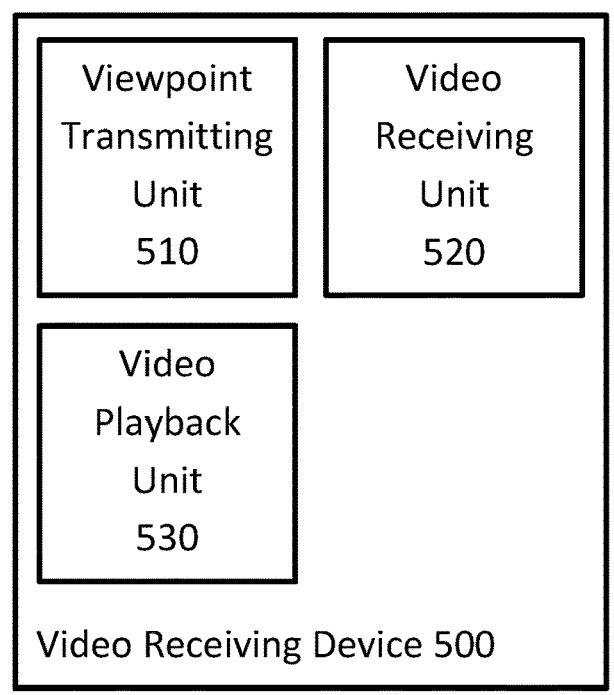
FIG. 5 schematically illustrates a video receiving device.

FIG. 5 schematically illustrates a video receiving device 500 for receiving video content comprising a plurality of viewpoints, the device comprising a viewpoint transmitting unit 510, a video receiving unit 520 and a video playback unit 530.

The viewpoint transmitting unit 510 is operable to transmit information identifying a requested viewpoint in the video content. This could take the form of information indicative of a location in the video, information requesting a particular tile of the video, information relating to HMD position/orientation for the display device, or any other suitable information that could be used to identify a region of the video that should be provided to the viewer.

The video receiving unit 520 is operable to receive a video from a video providing device in dependence upon the transmitted viewpoint information, the video being one of a plurality of versions of a video for each of a plurality of the viewpoints in the video content, the videos being encoded such that each video comprises a region of high resolution corresponding to that viewpoint. A plurality of the videos each comprise the same region of high resolution, and each video comprising the same region of high resolution is encoded with a temporal offset of the group of pictures relative to those other videos with the same region of high resolution. The group of pictures offsets define video switching times for each video.

The video playback unit 530 is operable to display the received content to a viewer via a display, for example an HMD. The display could be a separate physical unit to the video receiving device 500, or it could be integrated into a single device such as a mobile phone or portable games console.

Figure 6:
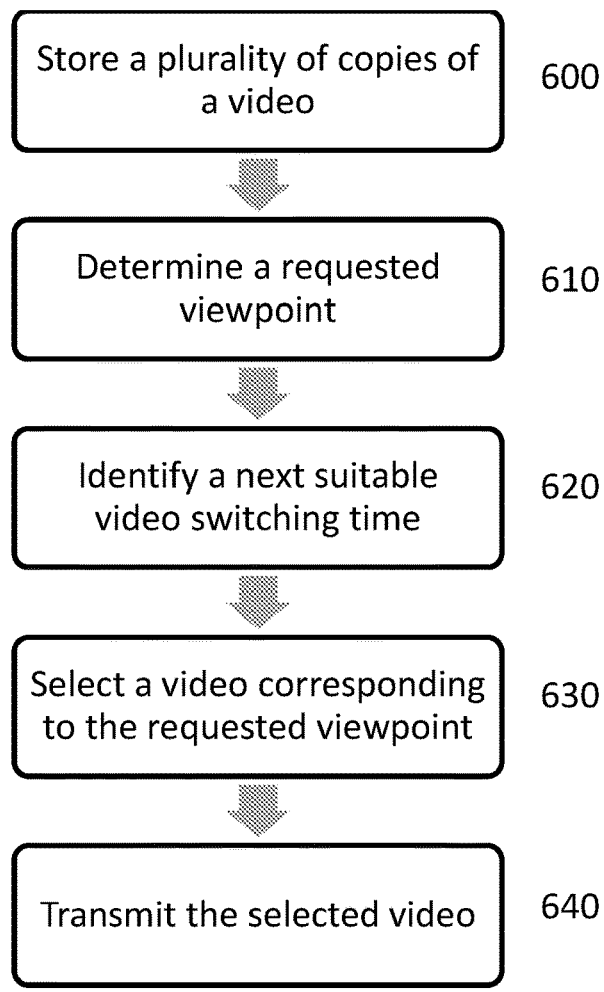
FIG. 6 schematically illustrates a video providing method.

FIG. 6 schematically illustrates a video providing method for providing video content comprising a plurality of viewpoints.

A step 600 comprises storing a plurality of versions of a video for each of a plurality of the viewpoints in the video content, the videos being encoded such that each video comprises a region of high resolution corresponding to that viewpoint. A plurality of the videos each comprise the same region of high resolution, and each video comprising the same region of high resolution is encoded with a temporal offset of the group of pictures relative to those other videos with the same region of high resolution. The group of pictures offsets define video switching times for each video.

A step 610 comprises determining a requested viewpoint in the video content. The requested viewpoint may be determined based upon one or more of the position and/or orientation of the video receiving device, information specifying a viewpoint, or coordinates indicating a region of the video, for example.

A step 620 comprises identifying a next suitable video switching time from amongst the plurality of video switching times.

A step 630 comprises selecting a video with a high resolution region corresponding to the requested viewpoint and the identified video switching time.

A step 640 comprises transmitting the selected video to a video receiving device.

Figure 7:
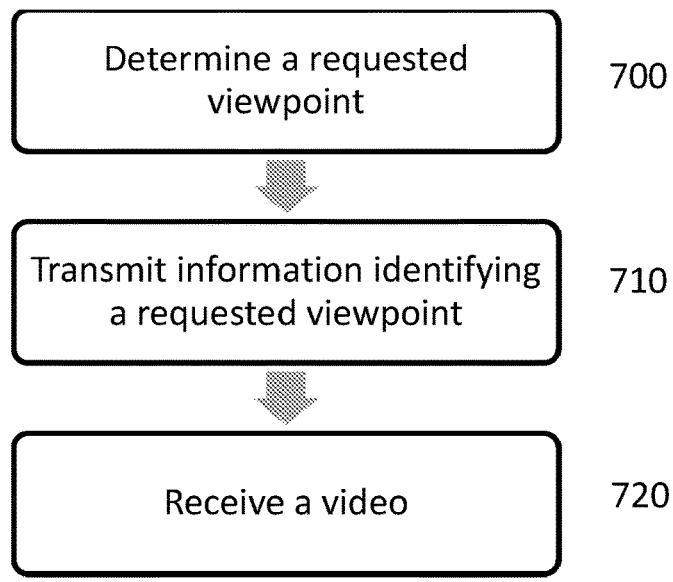
FIG. 7 schematically illustrates a video receiving method.

FIG. 7 schematically illustrates a video receiving method for receiving video content comprising a plurality of viewpoints.

A step 700 comprises determining a requested viewpoint in the video content, based upon one or more of the position and/or orientation of the video receiving device, information specifying a viewpoint, or coordinates indicating a region of the video, for example.

A step 710 comprises transmitting information identifying the requested viewpoint in the video content.

A step 720 comprises receiving a video from a video providing device in dependence upon the transmitted viewpoint information, the video being one of a plurality of versions of a video for each of a plurality of the viewpoints in the video content, the videos being encoded such that each video comprises a region of high resolution corresponding to that viewpoint. A plurality of the videos each comprise the same region of high resolution, and each video comprising the same region of high resolution is encoded with a temporal offset of the group of pictures relative to those other videos with the same region of high resolution. The group of pictures offsets define video switching times for each video.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The invention claimed is:

1. A video providing device for providing, video content comprising a plurality of viewpoints, the device comprising:
a video storage unit operable to store a plurality of versions of a video for each of a plurality of the viewpoints in the video content, the videos being encoded such that each video comprises a region of high resolution corresponding to that viewpoint, wherein:
a plurality of the videos each comprise the same region of high resolution, and
each video comprising the same region of high resolution is encoded with a temporal offset of the group of pictures relative to those other videos with the same region of high resolution, the group of pictures offsets defining video switching times for each video;
a viewpoint determining unit operable to determine a requested viewpoint in the video content;
a timing identification unit operable to identify a next suitable video switching time from amongst the plurality of video switching times;
a video selection unit operable to select a video with a high resolution region corresponding to the requested viewpoint and the identified video switching time; and
a video transmitting unit operable to transmit the selected video to a video receiving device,
wherein the temporal offset of the group of pictures is at least one of: (i) dependent upon the content of the video content, (ii) dependent upon the viewpoint, and (iii) proportional to the difference between the resolution of a high resolution area and a low resolution area of the video if the video comprises areas of different resolution.

2. The video providing device according to claim 1, wherein the group of pictures duration is two seconds or more.

3. The video providing device according to claim 1, wherein the group of pictures duration is determined so as to obtain a target bandwidth during transmission.

4. The video providing device according to claim 1, wherein the group of pictures offset is less than one second between two consecutively offset videos.

5. The video providing device according to claim 1, wherein the group of pictures offset is not the same between each consecutive offset video.

6. The video providing device according to claim 1, wherein there are six viewpoints, representing a cube mapping of the video.

7. The video providing device according to claim 1, wherein the requested viewpoint is determined haled upon one or more of: the position and/or orientation of the video receiving device, information specifying, a viewpoint, or coordinates indicating a region of the video.

8. The video providing device according to claim 1, wherein the video receiving device is associated with a head-mountable display.

9. A video receiving device for receiving video content comprising a plurality of viewpoints, the device comprising:
a viewpoint transmitting unit operable to transmit information identifying a requested viewpoint in the video content; and
a video receiving unit operable to receive a video from a video providing device in dependence upon the transmitted viewpoint information, the video being one of a plurality of versions of a video for each of a plurality of the viewpoints in the video content, the videos being encoded such that each video comprises a region of high resolution corresponding to that viewpoint, wherein:
a plurality of the videos each comprise the same region of high resolution, and
each video comprising the same region of high resolution is encoded with a temporal offset of the group of pictures relative to those other videos with the same region of high resolution, the group of pictures offsets defining video switching times for each video,
wherein the temporal offset of the group of pictures is at least one of: (i) dependent upon the content of the video content, (ii) dependent upon the viewpoint, and (iii) proportional to the difference between the resolution of a high resolution area and a low resolution area of the video if the video comprises areas of different resolution.

10. A video providing method for providing video content comprising a plurality of viewpoints, the method comprising:

storing a plurality of versions of a video for each of a plurality of the viewpoints in the video content, the videos being encoded such that each video comprises a region of high resolution corresponding to that viewpoint, wherein:

a plurality of the videos each comprise the same region of high resolution, and each video comprising the same region of high resolution is encoded with a temporal offset of the group of pictures relative to those other videos with the same region of high resolution, the group of pictures offsets defining video switching times for each video;

determining a requested viewpoint in the video content;

identifying a next suitable video switching time from amongst the plurality of video switching times;

selecting a video with a high resolution region corresponding to the requested viewpoint and the identified video switching time; and transmitting the selected video to a video receiving device, wherein the temporal offset of the group of pictures is at least one of: (i) dependent upon the content of the video content, (ii) dependent upon the viewpoint, and (iii) proportional to the difference between the resolution of a inch resolution area and a low resolution area of the video if the video comprises areas of different resolution.

11. A video receiving method for receiving video content comprising a plurality of viewpoints, the method comprising:

determining a requested viewpoint in the video content:

transmitting information identifying the requested viewpoint in the video content; and receiving a video from a video providing device in dependence upon the transmitted viewpoint information, the video being one of a plurality of versions of a video for each of a plurality of the viewpoints in the video content, the videos being encoded such that each video comprises a region of high resolution corresponding to that viewpoint, wherein:

a plurality of the videos each comprise the same region of high resolution, and each video comprising the same region of high resolution is encoded with a temporal offset of the group of pictures relative to those other videos with the same region of high resolution, the group of pictures offsets defining video switching times for each video, wherein the temporal offset of the group of pictures is at least one of: (i) dependent upon the content of the video content, (ii) dependent upon the viewpoint, and (iii) proportional to the difference between the resolution of a high resolution area and a low resolution area of the video if the video comprises areas of different resolution.

12. A non-transitory, computer readable storage medium containing a computer program which, when executed by a computer, causes the computer to execute a video providing method for providing video content comprising a plurality of viewpoints, the method comprising:

storing a plurality of versions of a video for each of a plurality of the viewpoints in the video content, the videos being encoded such that each video comprises a region of high resolution corresponding to that viewpoint, wherein:

a plurality of the videos each comprise the same region of high resolution, and each video comprising the same region of high resolution is encoded with a temporal offset of the group of pictures relative to those other videos with the same region of high resolution, the group of pictures offsets defining video switching times for each video;

determining a requested viewpoint in the video content;

identifying a next suitable video switching time from amongst the plurality of video switching times;

selecting a video with a high resolution region corresponding to the requested viewpoint and the identified video switching time; and transmitting the selected video to a video receiving device, wherein the temporal offset of the group of pictures is at least one of: (i) dependent upon the content of the video content, (ii) dependent upon the viewpoint, and (iii) proportional to the difference between the resolution of a high resolution area and a low resolution area of the video if the video comprises areas of different resolution.

13. A non-transitory, computer readable storage medium containing a computer program which, when executed by a computer, causes the computer to execute a video receiving method for receiving video content comprising a plurality of viewpoints, the method comprising:

determining a requested viewpoint in the video content:

transmitting information identifying the requested viewpoint in the video content; and receiving a video from a video providing device in dependence upon the transmitted viewpoint information, the video being one of a plurality of versions of a video for each of a plurality of the viewpoints in the video content, the videos being encoded such that each video comprises a region of high resolution corresponding to that viewpoint, wherein:

a plurality of the videos each comprise the same region of high resolution, and each video comprising the same region of high resolution is encoded with a temporal offset of the group of pictures relative to those other videos with the same region of high resolution, the group of pictures offsets defining video switching times for each video, wherein the temporal offset of the group of pictures is at least one of: (i) dependent upon the content of the video content, (ii) dependent upon the viewpoint, and (iii) proportional to the difference between the resolution of a high resolution area and a low resolution area of the video if the video comprises areas of different resolution.

* * * * *